(12) United States Patent
Dent (10) Patent No.: US 6,868,270 B2
(45) Date of Patent: Mar. 15, 2005

(54) DUAL-MODE METHODS, SYSTEMS, AND TERMINALS PROVIDING REDUCED MOBILE TERMINAL REGISTRATIONS

(75) Inventor: Paul Wilkinson Dent, Pittsboro, NC (US)

(73) Assignee: Telefonaktiebolaget L.M. Ericsson, Stockholm (SE)

( * ) Notice: Subject to any disclaimer, the term of this patent is extended or adjusted under 35 U.S.C. 154(b) by 862 days.

(21) Appl. No.: 09/779,367

(22) Filed: Feb. 8, 2001

(65) Prior Publication Data

US 2001/0004595 A1 Jun. 21, 2001

Related U.S. Application Data

(63) Continuation-in-part of application No. 09/526,673, filed on Mar. 16, 2000, now Pat. No. 6,418,319, which is a continuation of application No. 08/881,253, filed on Jun. 24, 1997, now Pat. No. 6,195,555, which is a continuation of application No. 08/368,877, filed on Jan. 5, 1995, now abandoned, which is a continuation-in-part of application No. 08/179,958, filed on Jan. 11, 1994, now abandoned, said application No. 09/779,367, and a continuation-in-part of application No. 08/754,382, filed on Nov. 21, 1996, which is a continuation of application No. 08/179,958, filed on Jan. 11, 1994, now abandoned.

(51) Int. Cl.$^7$ ............................................. H04Q 7/20
(52) U.S. Cl. ................. 455/435.1; 455/455; 455/456.2; 455/456.3
(58) Field of Search ........................... 455/435.1, 456.2, 455/456.3

(56) References Cited

U.S. PATENT DOCUMENTS 4,527,284 A 7/1985 Kottger ........................ 455/33

(List continued on next page.)

FOREIGN PATENT DOCUMENTS

EP 501 706 9/1992 ............ H04Q/7/08

(List continued on next page.)

OTHER PUBLICATIONS

Dzung, "Link Control in Terrestrial/Satellite Mobile Communication Systems", Conference Mobile Radio and Personal Communication 1991.

(List continued on next page.)

*Primary Examiner*—William D. Cumming
(74) *Attorney, Agent, or Firm*—Myers Bigel Sibley & Sajovec (57) ABSTRACT

A method of operating a mobile terminal providing wireless communications can include receiving communications service from a first communications network providing service over a first coverage area. While receiving communications service from the first communications network, a first identity code can be received from a second communications network providing service over a plurality of second coverage areas wherein a first one of the second coverage areas includes the first coverage area and wherein the first identity code from the second communications network identifies availability of service with the second communications network in the first one of the second coverage areas. After loss of communications with the first communications network, a second identity code can be received from the second communications network. When the second identity code from the second communications network is different than the first identity code from the second communications network, a registration can be performed with the second communications network so that communications service can be received by the mobile terminal from the second communications network in a second one of the second coverage areas corresponding to the second identity code from the second communications network.

20 Claims, 5 Drawing Sheets

U.S. PATENT DOCUMENTS

| | | | |
|---|---|---|---|
| 4,972,456 A | 11/1990 | Kaczmarek et al. | 379/59 |
| 5,073,900 A | 12/1991 | Mallinckrodt | 375/59 |
| 5,081,703 A | 1/1992 | Lee | 455/13 |
| 5,119,504 A | 6/1992 | Durboraw, III | 455/54.1 |
| 5,151,919 A | 9/1992 | Dent | 375/1 |
| 5,161,248 A | 11/1992 | Bertiger et al. | 455/17 |
| 5,187,805 A | 2/1993 | Bertiger et al. | 455/12.1 |
| 5,208,756 A | 5/1993 | Song | 364/449 |
| 5,214,789 A | 5/1993 | George | 455/33.2 |
| 5,218,619 A | 6/1993 | Dent | 375/1 |
| 5,235,633 A | 8/1993 | Dennison et al. | 379/60 |
| 5,268,694 A | 12/1993 | Jan et al. | 342/354 |
| 5,280,521 A | 1/1994 | Itoh | 379/58 |
| 5,287,541 A | 2/1994 | Davis et al. | 455/12.1 |
| 5,289,572 A | 2/1994 | Yano et al. | 395/155 |
| 5,303,286 A | 4/1994 | Wiedeman | 379/59 |
| 5,305,466 A | 4/1994 | Taketsugu | 455/33.1 |
| 5,313,457 A | 5/1994 | Hostetter et al. | 370/18 |
| 5,327,572 A | 7/1994 | Freeburg | 455/13.1 |
| 5,343,512 A | 8/1994 | Wang et al. | 379/59 |
| 5,369,681 A | 11/1994 | Boudreau et al. | 379/87 |
| 5,400,392 A | 3/1995 | Nagashima et al. | 379/60 |
| 5,408,237 A | 4/1995 | Patterson et al. | 342/354 |
| 5,428,816 A | 6/1995 | Barnett et al. | |
| 5,463,672 A | 10/1995 | Kage | 379/59 |
| 5,483,664 A | 1/1996 | Moritz et al. | 455/13.1 |
| 5,490,203 A | 2/1996 | Jain et al. | 379/59 |
| 5,502,757 A | 3/1996 | Bales et al. | 379/58 |
| 5,526,404 A | 6/1996 | Wiedeman et al. | 379/60 |
| 5,528,247 A | 6/1996 | Nonami | 342/357 |
| 5,535,432 A | 7/1996 | Dent | 455/77 |
| 5,539,395 A | 7/1996 | Buss et al. | 340/827 |
| 5,543,813 A | 8/1996 | Araki et al. | 342/357 |
| 5,546,445 A | 8/1996 | Dennison et al. | 379/60 |
| 5,568,165 A | 10/1996 | Kimura | 345/185 |
| 5,586,165 A | 12/1996 | Wiedeman | 379/58 |
| 5,594,776 A | 1/1997 | Dent | 379/58 |
| 5,600,706 A | 2/1997 | Dunn et al. | 379/59 |
| 5,602,903 A | 2/1997 | LeBlanc et al. | 379/60 |
| 5,613,204 A | 3/1997 | Haberman et al. | |
| 5,619,503 A | 4/1997 | Dent | 370/330 |
| 5,621,414 A | 4/1997 | Nakagawa | 342/350 |
| 5,664,006 A | 9/1997 | Monte et al. | 455/405 |
| 5,668,837 A | 9/1997 | Dent | 375/316 |
| 5,745,856 A | 4/1998 | Dent | 455/552 |
| 5,826,173 A | 10/1998 | Dent | 455/38.3 |
| 5,907,809 A | 5/1999 | Molnar et al. | 455/456 |
| 6,195,555 B1 * | 2/2001 | Dent | 455/456.2 |
| 6,418,319 B1 * | 7/2002 | Dent | 455/456.3 |
| 2001/0004595 A1 * | 6/2001 | Dent | 455/435 |

FOREIGN PATENT DOCUMENTS

| | | | |
|---|---|---|---|
| EP | 536 921 | 4/1993 | H04B/7/195 |
| EP | 562 374 | 9/1993 | H04B/7/195 |
| EP | 662 758 | 7/1995 | H04B/7/185 |
| WO | WO93/13618 | 7/1993 | H04M/11/00 |
| WO | WO93/23965 | 11/1993 | H04Q/7/04 |
| WO | WO96/21332 | 7/1996 | |
| WO | WO 02/063892 * | 8/2002 | |

OTHER PUBLICATIONS

Priscoli, Muratore, "Study on the Integration Between the GSM Cellular Network and a Satellite System", Global Telecommunications Conference 1993.

P.W. Baranowsky, "MSAT and Cellular Hybrid Networking", Proceedings of the Third International Mobile Satellite Conderence, pp. 149–154, Jan. 1, 1993.

F.D. Priscoli, "Architecture of on Integrated GSM–Satellite System", European Transactions on Telecommunications, vol. 5, No. 5, Sep.–Oct., 1994, pp 91–99.

GSM Standard 1.02—Version 3.0.0–1, ETSI/PT12, Released 1/90.

Priscoli, F.D.; Functional Areas for Advanced Mobile Satellite Systems, Vehicular Technology Conference, IEEE $47^{th}$ Phoenix, AZ, May 1997; pp 223–227.

Argenti, F. et al; Integration of Satellites into GSM: Signaling Flow Analysis; Universal Personal Communications, 1996, Record, 1996 $5^{th}$ IEEE International Conference on Cambridge, MA, pp 755–759.

"Communication Relating to the Results of the Partial International Search" for International App. No. PCT/US02/03440 of Oct. 17, 2002.

Zhao et al.; "System Architecture for GSM–Satellite Integration" Personal, Indoor and Mobile Radio Communications, PIMRC, Seventh IEEE International Symposium. Taipei. Taiwan pp. 953–957 (1996).

International Search Report for PCT/US 02/03440; Date of Mailing May 12, 2002.

Corazza, et al; "Handover procedures in Integrated Satellite and Terrestrial Mobile System", proceedings of the International Mobile Satellite Conference, Mar. 19, 1993, pp 143–148.

* cited by examiner

DUAL-MODE METHODS, SYSTEMS, AND TERMINALS PROVIDING REDUCED MOBILE TERMINAL REGISTRATIONS

RELATED APPLICATIONS

This application is a continuation-in-part application claiming priority from U.S. application Ser. No. 09/526,673 entitled "Method of Directing a Call to a Mobile Telephone in a Dual Mode Cellular-Satelite Communications Network" filed Mar. 16, 2000; now U.S. Pat. No. 6,418,319 which is a continuation of U.S. application Ser. No. 08/881,253 entitled "Position Registration" filed Jun. 24, 1997; now U.S. Pat. No. 6,195,555 which is a continuation of U.S. application Ser. No. 08/368,877 entitled "Position Registration" filed Jan. 5, 1995, now abandoned; which is a continuation-in-part application claiming priority from U.S. appiication Ser. No. 08/179,958 entitled "Position Registration for Cellular Satellite Communication Systems" filed Jan. 11, 1994, now abandoned. This application also claims priority as a continuation-in-part application from U.S. application Ser. No. 08/754,382 entitled "Position Registration for Cellular Satellite Communication Systems" filed Nov. 21, 1996; which is a continuation of U.S. application Ser. No. 08/179,958 entitled "Position Registration for Cellular Satellite Communication Systems" filed Jan. 11, 1994, now abandoned. The disclosures of these applications are hereby incorporated herein in their entirety by reference.

BACKGROUND OF THE INVENTION

The present invention relates to the field of communications and more particularly to dual-mode communications systems, networks, terminals, and methods.

When mobile phones are in a standby or idle mode, the idle mobile phones may listen to a signal radiated by the communication system in order to recognize if and when the mobile phone is being called. An attractive communication system from the user's viewpoint would be a dual mode satellite/cellular telephone that would listen to and connect calls with a land-based cellular system if the mobile phone is in range, or to a satellite system when the land-based cellular system is not in range. The principle advantage of such a dual system is that the number of subscribers outside cellular coverage at any instant might only be a small fraction of the total number of subscribers, thus the number of subscribers needing to access the satellite system is reduced. This permits a satellite system of limited capacity to take on a much greater number of subscribers than its capacity would otherwise allow, perhaps 100 times the equivalent ratio in cellular systems. In addition, the number of subscribers actively listening to a calling channel, i.e. those in the idle mode, already exceeds the number actually involved in conversation by a factor of 20 to 200. As a result, the number of potential subscribers to a dual mode satellite/cellular system can be 2,000 to 20,000 times the satellite system's call capacity.

It is clear that in such a dual mode communication system, the network should preferably know whether a particular mobile phone should be called via the land-based cellular system or via the satellite system. However, to call every subscriber via both systems would pose a very severe calling channel load in view of the potential 100 fold increase in subscribers as mentioned above. Therefore, it is desirable to restrict calling/paging of subscribers via the satellite system to only those mobile phones that are known or suspected to be presently listening to the satellite calling channel. In a cellular communication system or a satellite communication system, it may be desirable to restrict paging/calling areas to those areas in which a called mobile phone is thought to be located. Both cellular and satellite systems are more or less global and the paging capacity to call every mobile phone over the whole globe is hard to provide. This problem is solved by means of registration.

Registration means that a mobile telephone informs the network what calling channel it is presently listening to. The network then knows which of a number of limited paging areas the mobile telephone is most likely to be in, and calls to that mobile telephone can be broadcast to that paging area. This process can involve transmitting calls to a mobile telephone via several base station transmitters at different sites in the same paging area. This increases the paging load per transmitter, but reduces the network load for handling reregistrations, as a mobile telephone need no longer transmit a reregistration message every time it finds a stronger transmitter to listen to. In this example, the mobile telephone only needs to reregister when it detects that the transmission it switched to monitoring belongs to a different paging area than the previous one. Paging areas and reregistration criteria are used, for example, in the Pan European GSM cellular system.

To achieve an economically useful capacity to serve a large number of subscribers, satellite communication systems may allow reuse of the available spectrum many times over the globe. This is achieved by the use of multiple spot beam antennas that divide the illumination of the chosen service area between many smaller regions. Ideally the available spectrum may be reused in each of the smaller regions by use of the invention described in U.S. Pat. No. 5,619,503, entitled "A Cellular/Satellite Communication System With Improved Frequency Re-use", issued Apr. 8, 1997, which is incorporated herein by reference.

The most promising satellite systems for such applications are those which are in a near earth orbit and stationary orbit. The disadvantage of satellites in stationary orbits is that relatively large antennas may be needed to create the same size spot beams from the 40,000 km distance creating a problem for two-way conversations. However, the disadvantage of satellites in near earth orbits is that the satellites move relative to the earth and thus the areas that the spot beams illuminate may change as the satellites circle the earth. Even if steps are taken to steer the spot beams to more or less the same regions, the satellite will eventually pass over the horizon and will have to be replaced by a rising satellite. When this occurs, it may be preferred that the entire population of mobile telephones listening in the idle mode to a paging channel of the satellite which is about to pass over the horizon does not attempt to reregister simultaneously due to the fact that they are now listening to a new paging channel of the new satellite. As mentioned above, the number of mobile telephones in the idle mode is much greater than the satellite system's capacity to handle traffic. Therefore, bulk registrations may be difficult to handle.

SUMMARY OF THE INVENTION

According to embodiments of the present invention, operating a mobile terminal can include receiving communications service from a first communications network providing service over a first coverage area, and while receiving communications service from the first communications network, receiving a first identity code from a second communications network providing service over a plurality of second coverage areas. More particularly, a first one of the second coverage areas includes the first coverage area and the first identity code from the second communications network identifies availability of service with the second communications network in the first one of the second coverage areas. After loss of communications with the first communications network, a second identity code can be received from the second communications network. When the second identity code from the second communications network is different than the first identity code from the second communications network, a registration can be performed with the second communications network so that communications service can be received by the mobile terminal from the second communications network in a second one of the second coverage areas corresponding to the second identity code from the second communications network.

According to additional embodiments of the present invention, calls can be forwarded to a dual-mode mobile terminal providing communications with a terrestrial communications network and a satellite communications network. More particularly, a location identifier for the dual-mode mobile terminal can be stored wherein the location identifier identifies a location within which the mobile terminal has been most recently registered for communications service with the terrestrial communications network. After loss of communications between the dual-mode mobile terminal and the terrestrial communications network, the location within which the dual-mode mobile terminal has been most recently registered for communications service with the terrestrial communications network can be identified for the satellite communications network.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
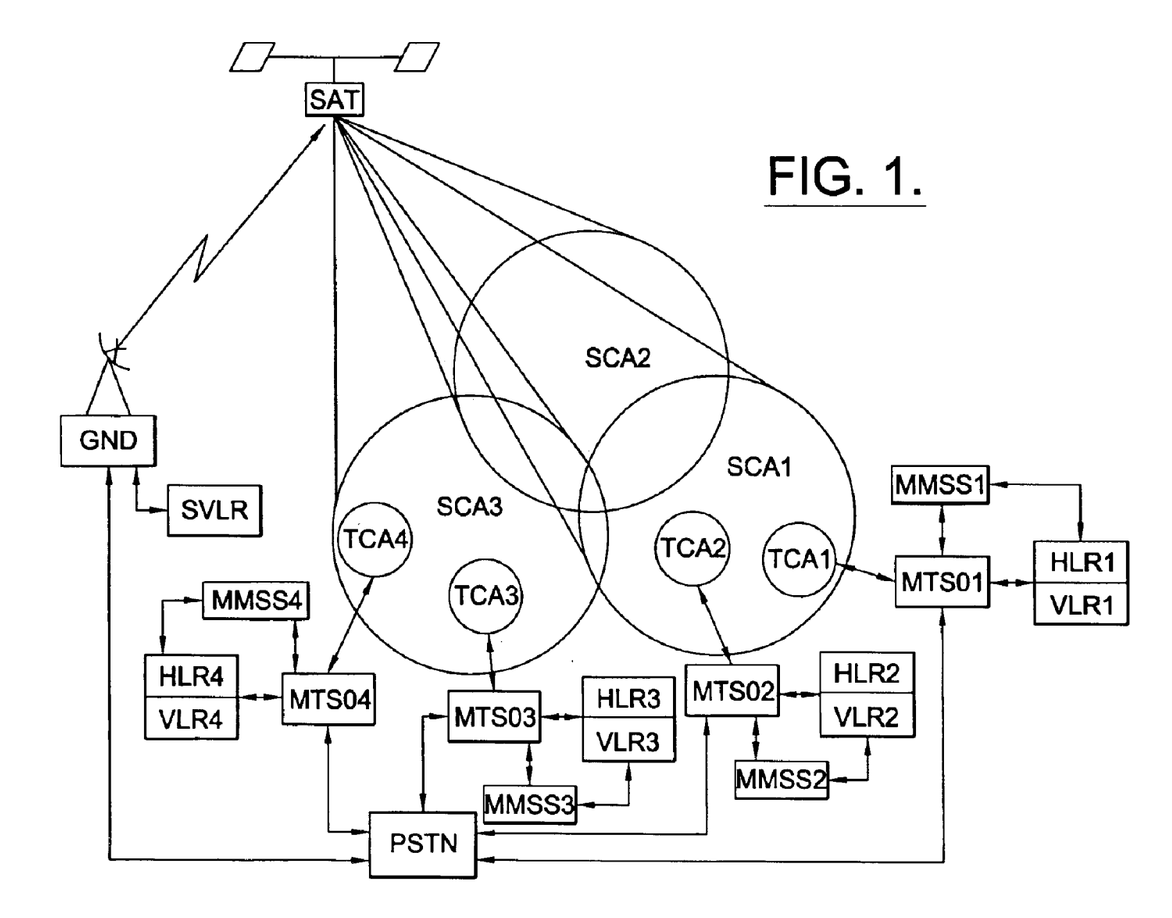
FIG. 1 is a diagram illustrating terrestrial and satellite communications networks according to embodiments to the present invention.
Figure 2:
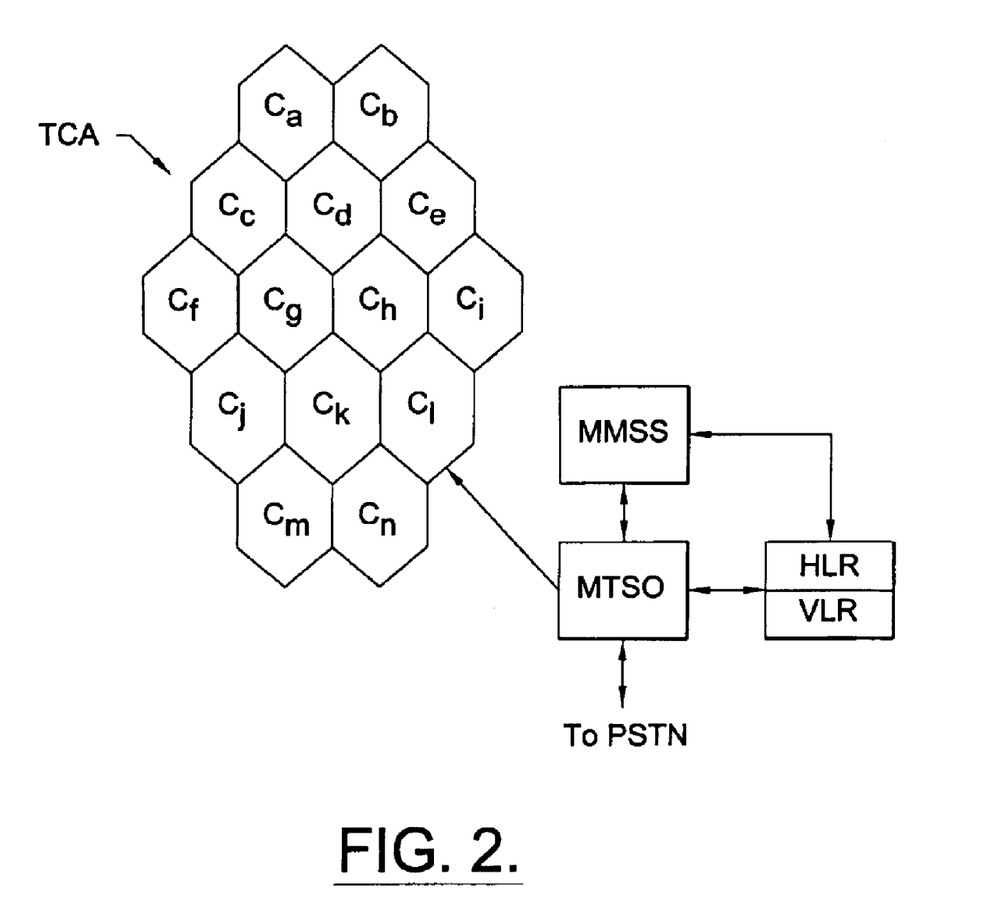
FIG. 2 is a diagram of a terrestrial cellular communications network according to embodiments to the present invention.

A dual-mode satellite and terrestrial mobile communications system according to embodiments of the present invention is illustrated in FIG. 1. As shown, a satellite communications network including a ground station GND and a multi-beam orbiting satellite SAT can provide communications service with one or more mobile communications terminals located in satellite coverage areas SCA1–3 via respective antenna spot beams. In addition, terrestrial communications networks, such as GSM cellular communications networks, can provide communications service with one or more mobile communications terminals located in respective terrestrial coverage areas TCA1–4, typically provided in regions of relatively high population density. FIG. 2 illustrates an example of a terrestrial communications network including a terrestrial coverage area TCA having a plurality of cells Ca–n, a mobile telephone switching office MTSO, a home location register HLR, a visitor location register VLR, and a mobility management subsystem MMSS according to the GSM cellular communications standard. A mobile terminal can, thus, be configured to communicate via one or more of the terrestrial communications networks and/or the satellite communications network. While the mobility management subsystem is shown as a separate element of each terrestrial network, aspects of mobility management may be performed by the mobile telephone switching office, the home location registers, and/or the visitor location registers. Alternately, mobility management for multiple terrestrial networks may be performed by a mobility management system separate from the terrestrial networks.

Communications via a local area terrestrial communications network are generally preferred when available because terrestrial communications can generally be provided at a lower cost than satellite communications. When communications via a terrestrial network are not available, communications via the wide area satellite network may be provided. A mobile terminal may communicate via the satellite communications network, for example, when outside the terrestrial coverage areas, when in a null region of a terrestrial coverage area, when there is no available capacity in a terrestrial coverage area, or when a terrestrial system does not provide service compatible with the mobile terminal.

Figure 3:
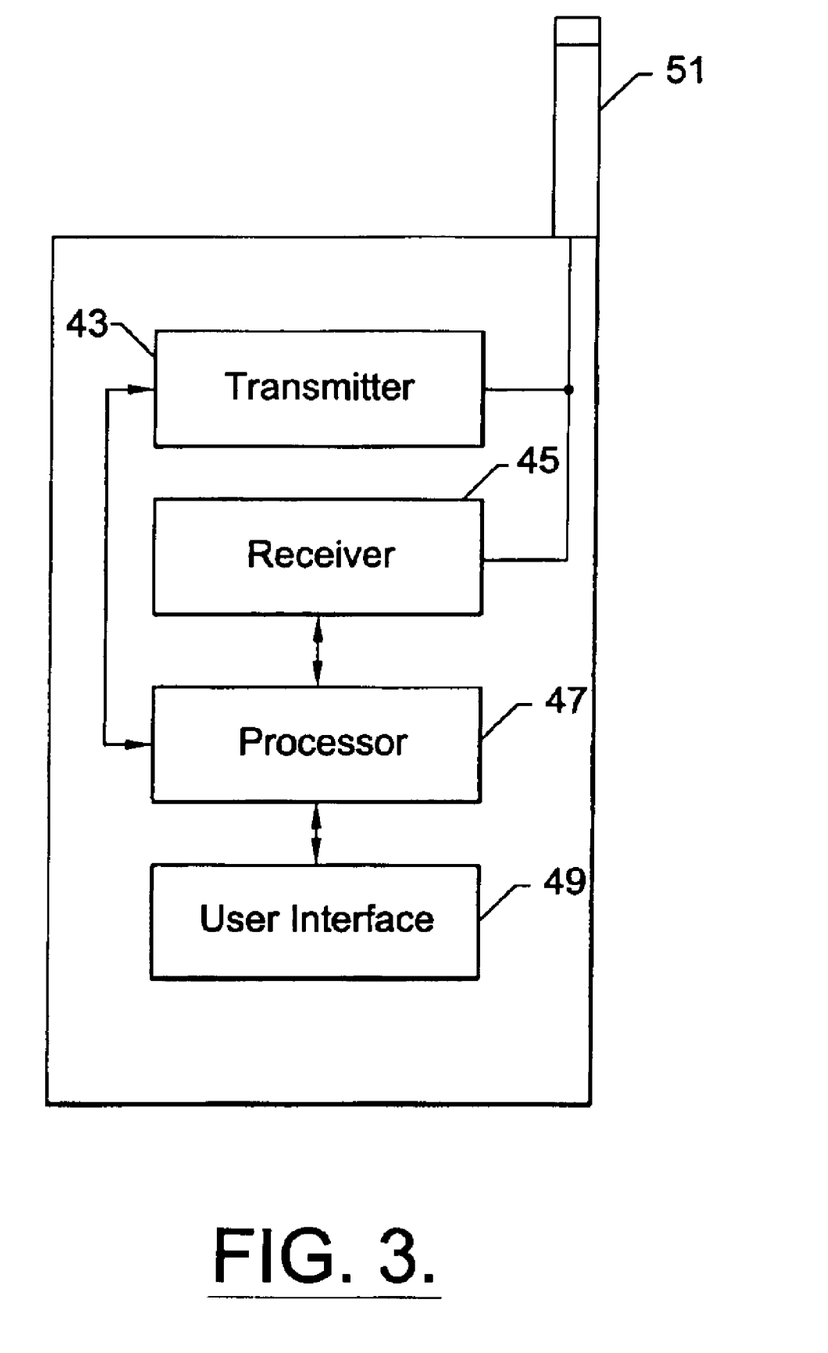
FIG. 3 is a block diagram of a mobile terminal according to embodiments to the present invention.

As shown in FIG. 3, a dual-mode mobile terminal 41 according to the present invention can include a transmitter 43, a receiver 45, a processor 47, and a user interface 49 which may include a speaker, a microphone, a keypad, and/or a display. As shown, the transmitter and receiver are each coupled with antenna 51 and the processor 47 to transmit and receive communications from terrestrial and satellite networks in the terrestrial and satellite coverage areas illustrated in FIG. 1. The user interface 49 is coupled with the processor 47 and can accept input from and provide output to a user of the mobile terminal. As will be understood by those having skill in the art, the mobile terminal 41 can be a wireless communications device such as a radiotelephone, a personal digital assistant, and/or a portable computing device providing data, voice, graphic, and/or video communications. Moreover, the transmitter can be defined to include a single transmitter providing transmissions to different types of communications networks such as terrestrial and satellite networks, or multiple transmitters providing transmissions to the different types of networks. Similarly, the receiver can be defined to include a single receiver providing reception from different types of communications networks such as terrestrial and satellite networks, or multiple receivers providing reception from the different types of networks.

As further shown in FIGS. 1 and 2, each of the terrestrial communications networks may be a cellular communications network including a plurality of base stations providing service for respective cells Ca–n of the terrestrial coverage area TCA1–4, a mobile telephone switching office MTSO1–4, home location register HLR1–4, visitor location register VLR1–4, and mobility management subsystem MMSS1–4. Moreover, each of the terrestrial networks and the satellite network can be coupled to a public switched telephone network PSTN so that communications can be provided between two mobile terminals via the satellite network, between two mobile terminals via one or more terrestrial networks, between one mobile terminal via the satellite network and a second mobile terminal via one of the terrestrial networks, or between a mobile terminal and a conventional telephone via the PSTN and one of the satellite or terrestrial networks. Alternately, one or more of the terrestrial networks and/or the satellite network may be coupled separately without coupling through the PSTN.

In a terrestrial GSM cellular communications network according to embodiments of the present invention, the home location register HLR includes a register for each mobile terminal native to that network. The HLR register for each native mobile terminal is used to record the last known position of the respective mobile terminal so that calls to the native terminal can be appropriately routed. Accordingly, when a call is placed to a mobile terminal, the call is first routed to the home location register of the native cellular network for the mobile terminal, and the cellular network (via the MMSS) determines where to page the called mobile terminal based on the location indicated by the respective HLR register. If the mobile terminal was last located in a cell of the native terrestrial coverage area, the native MMSS can direct the call to the appropriate cell or cells of a designated paging area. If the mobile terminal was last located in the terrestrial coverage area of another non-native terrestrial network, the native MMSS can reroute the call to the non-native terrestrial network. If the mobile terminal has detached from a terrestrial network or is otherwise being serviced by the satellite communications network, the native MMSS can reroute the call to the satellite communications network.

According to embodiments of the present invention, the home location registers HLR for a terrestrial network can include a register for each mobile terminal native to that terrestrial network, and the visitor location registers VLR for the terrestrial network can include a VLR register for each mobile terminal (native or non-native) currently registered for communication with the terrestrial network. The VLR register for a mobile terminal (native or non-native) currently registered with the terrestrial network can define a paging area (one or more cells) for the registered mobile terminal. The HLR register for a native mobile terminal can include a VLR ID identifying either a VLR register of any terrestrial network to which a native mobile terminal is registered, or an antenna beam of the satellite SAT through which the mobile terminal can be reached. Accordingly, a call placed to a mobile terminal is first routed to the HLR register of the native terrestrial network for the mobile terminal to determine the VLR ID for the mobile terminal. The VLR ID is used by the mobility management subsystem to route the call to the appropriate paging area of a native or non-native terrestrial network or to an antenna beam of a satellite network.

By way of example, a mobile terminal may be native to a first terrestrial network including terrestrial coverage area TCA1, mobile telephone switching office MTSO1, home location registers HLR1, visitor location registers VLR1, and mobility management subsystem MMSS1. Home location registers HLR1 thus include an HLR register having a VLR ID stored therein corresponding to the mobile terminal whether the mobile terminal is currently being serviced through the first native terrestrial network or another non-native terrestrial network or the satellite network. The mobile terminal may also provide terrestrial communications through a second non-native terrestrial network including coverage area TCA2, MTSO2, HLR2, VLR2, and MMSS2 as well as through a first satellite coverage area SCA1 defined by the satellite network.

In addition, a VLR register is provided for the mobile terminal in any terrestrial network with which the mobile terminal is registered, and the VLR register identifies a paging area (one or more cells) within the respective terrestrial coverage area through which the mobile terminal should be paged. The satellite network may also include satellite visitor location registers SVLR including a VLR register for each mobile terminal being serviced through the satellite network wherein a VLR register identifies one or more antenna beams over which a respective registered mobile terminal can be paged. In other words, a VLR ID for a mobile terminal can be stored in a respective HLR register for the mobile terminal at the mobile terminal's native terrestrial network, and this VLR ID can be used by the mobility management subsystem to route calls to the mobile terminal through the native terrestrial network, to the mobile terminal through a non-native terrestrial network, or to the mobile terminal through a satellite network. The use of VLR registers and HLR registers is also discussed in application Ser. No. 08/754,382 entitled "Position Registration For Cellular Satellite Communication Systems" from which the present application claims priority. The disclosure of application Ser. No. 08/754,382 is hereby incorporated herein in its entirety by reference.

In other words, the VLR ID for a mobile terminal is stored in an HLR register in the HLR of the mobile terminal's native terrestrial network, and this VLR ID may be considered to represent a geographic location at which the mobile terminal has most recently been registered. For example, a mobile terminal may be native to a first terrestrial network providing service for the first terrestrial coverage area TCA1, but communications may also be provided for the mobile terminal by second, third, and fourth non-native terrestrial networks TCA2, TCA3, and TCA4. The VLR ID for the mobile terminal stored in HLR1 of the native terrestrial network can thus provide a geographic location of the mobile terminal as being within one of the terrestrial coverage areas TCA1, TCA2, TCA3, and TCA4 when the mobile terminal is registered for service with one of the corresponding terrestrial networks. Similarly, the VLR ID for the mobile terminal can provide a geographic location of the mobile terminal as being within one of the satellite coverage areas SCA1, SCA2, and SCA3 when the mobile terminal is registered for service with one of the corresponding antenna beams of the satellite network.

In the event that a dual mode mobile terminal is communicating with one of the terrestrial communications networks covering terrestrial coverage areas TCA1–4 and the mobile terminal determines that service with the terrestrial network is about to be lost, the mobile terminal can perform a DETACH operation from the terrestrial network so that calls are forwarded to the satellite network and transmitted by the appropriate antenna beam to the satellite coverage area SCA1–3 in which the mobile terminal is located. The use of a DETACH operation is discussed in greater detail in U.S. application Ser. No. 08/754,382, the disclosure of which is incorporated herein in its entirety by reference.

If a DETACH operation is performed for a mobile terminal, the HLR register at the native terrestrial network for the detached mobile terminal can include an indication that a DETACH operation has been performed, and the native terrestrial network can forward an indication of the last known location of the mobile terminal to the satellite communications network. Based on the information transmitted by the native terrestrial communications network, the satellite communications network can provide a VLR register in the satellite visitor location registers SVLR for the detached mobile terminal identifying the antenna spot beam covering the satellite coverage area covering the terrestrial coverage area from which the detached mobile terminal detached. By performing a DETACH operation wherein the mobile terminal detaches from a terrestrial network instead of attaching to a satellite network, a load of over the air registration requests from mobile terminals to the satellite network can be reduced.

For example, the mobile terminal may be within the second terrestrial coverage area TCA2 when a DETACH operation is performed so that service should be provided by the satellite network. In response to the DETACH operation, the second terrestrial network providing service for the second terrestrial coverage area can inform the first native terrestrial network that the mobile terminal has performed the DETACH operation. In response, the first native terrestrial network can provide an approximate longitude and latitude for the second terrestrial coverage area TCA2 to the satellite system so that the satellite communications network can transmit pages to the DETACHED mobile terminal over the antenna spot beam for the first satellite coverage area SCA1 including the second terrestrial coverage area TCA2. Accordingly, calls can be forwarded from the first native terrestrial network to the satellite network, so that the detached mobile terminal can be paged over the antenna spot beam providing service to the first satellite coverage area SCA1. In this example, the HLR register for the detached mobile terminal includes a VLR ID directing incoming calls to the satellite network where the VLR register for the detached mobile terminal identifies the satellite coverage area SCA1.

In the alternative, the mobile terminal may be native to the first terrestrial network servicing the first terrestrial coverage area TCA1, and receiving service from the second terrestrial network in the second terrestrial coverage area TCA2 when service is lost without first performing a DETACH operation. In this situation, the HLR register for the mobile terminal directs the call to the second terrestrial network so that the mobile terminal is paged over the second terrestrial coverage area TCA2, but the page is not received by the mobile terminal which has lost service. The second terrestrial network thus informs the first terrestrial network that the mobile terminal did not respond. The first native terrestrial network can then forward the call to the satellite network along with positional information that the mobile terminal was last serviced in the second terrestrial coverage area so that the satellite system can page the mobile terminal over the first satellite coverage area SCA1 including the second terrestrial coverage area TCA2. If the mobile terminal responds, the satellite network can instruct the first native terrestrial network to update the HLR register for the mobile terminal so that future calls are forwarded to the satellite network.

When registered for operation with the antenna spot beam covering the first satellite coverage area SCA1, the mobile terminal can store a beam ID for the antenna spot beam for the first satellite coverage area SCA1. If after detaching from a terrestrial network and being registered with the first satellite coverage area SCA1, the mobile terminal is turned off and moved to a second satellite coverage area SCA2 before being turned on, pages sent to the first satellite coverage area may no longer reach the mobile terminal. The mobile terminal may thus compare the stored beam ID with a beam ID for the currently received antenna spot beam and perform a reregistration if there is a difference. Accordingly, the satellite network can update the VLR register for the mobile terminal so that pages are transmitted to the second satellite coverage area SCA2.

Using registration operations according to embodiments of the present invention, mobile terminals are not required to transmit registration requests to the satellite network every time communication is lost with a terrestrial network. Accordingly, a load of mobile terminal registration requests can be reduced so that a load on satellite capacity can be reduced.

Terrestrial networks, satellite networks, and mobile terminals according to embodiments of the present invention can thus route calls to a mobile terminal preferably via a ground based terrestrial network and alternately via satellite network in the event that the mobile terminal cannot be reached via the terrestrial network. The routing of calls to mobile terminals native to a terrestrial network can be performed by the mobility management subsystem of that network in coordination with the home location registers and visitor location registers of the terrestrial network. As discussed above, a VLR ID for each mobile terminal native to a terrestrial network can be used to route a call for a native mobile terminal to a paging area of the native terrestrial network, to a non-native terrestrial network, or to a satellite network.

When a mobile terminal originates a call via its native terrestrial network, a non-native network, or a satellite network, its transmission can be used to locate the telephone within a cell of a native or non-native terrestrial coverage area or within a satellite coverage area of a satellite network. This information can thus be relayed to the mobility management subsystem of the native terrestrial network for the mobile terminal. When calls are placed to a mobile terminal, however, the mobility management subsystem for the mobile terminal's native terrestrial network may need to determine how to route the call based on previously received information. If the mobile terminal has not transmitted recently, however, the previously received information may not be accurate.

In a terrestrial network according to embodiments of the present invention, a base station for each network cell may broadcast information identifying the terrestrial network, the base station within the network, and a paging area or location area to which the station belongs. In this context, a paging area is a group of neighboring base stations servicing neighboring cells that all broadcast paging messages to mobile terminals. By transmitting paging messages from a group of neighboring base stations in a paging area as opposed to transmitting paging messages from a single base station, the probability of reaching a mobile terminal can be increased if the mobile terminal has moved within the paging area since the last transmission. A mobile terminal may have last transmitted from cell Ch of FIG. 2, wherein cell Ch is part of a paging area including cells Cd, Ce, Cg, Ch, Ci, Ck, and Cl. A subsequent paging message for the mobile terminal can be transmitted to the paging area and received by the mobile terminal if within any of the cells of the paging area. The mobile terminal can then respond to any base station of the paging area based on signal strength and/or quality.

As long as the mobile terminal responds to a base station within the paging area within which the mobile terminal was previously registered, the mobility management subsystem does not need to update the HLR register and/or VLR register for the mobile terminal. In other words, the paging area for the mobile terminal stored in the VLR register corresponding to the mobile terminal does not need to be updated until the mobile terminal is moved to a different paging area, to a different terrestrial network, or to a satellite network. The mobile terminal can thus move between different cells of a paging area without performing registrations or location updates with the terrestrial network. In some terrestrial networks, a periodic location update may be specified such that a location update is performed after a set period of time whether the mobile terminal has changed paging areas or not.

If a mobile terminal detects that a base station to which it has chosen to listen belongs to a different paging area than the one to which the mobile terminal is registered, the mobile terminal may perform a location update by transmitting a registration request to the terrestrial network via the new base station. In response to the registration request, the mobility management subsystem can update the VLR register for the mobile terminal to identify the new paging area. By defining a paging area to include a cluster of neighboring cells, a mobile terminal does not need to perform a location update every time it crosses a cell boundary from one cell to another. Moreover, location updates resulting from the temporary fading of a base station signal can also be reduced. Timers can also be used to reduce unnecessary location updates by requiring passage of a predetermined period of time after the fading of a signal before requesting a location update based on a stronger signal of another paging area. The use of timers, however, may result in the loss of calls during the predetermined period of time after losing the signal of a first paging area and performing a location update in a new paging area.

In an alternative, a unique paging area may be defined for each mobile terminal so that a mobile terminal is always in the center of its own paging area. For example, when the mobile terminal is in cell Ch of FIG. 2, the paging area for the mobile terminal can include the cell Ch and all cells adjacent cell Ch. If the mobile terminal moves to cell Cd, the paging area for the mobile terminal can be redefined to include cell Cd and all cells adjacent cell Cd. The unique paging area can be accomplished by transmitting a list of base stations that belong to the new paging area to the mobile terminal after it has performed a location update.

Satellite networks as discussed above with regard to FIG. 1 may provide service through a plurality of antenna beams each defining a respective satellite coverage area SCA1–3 wherein a satellite coverage area is significantly larger than a cell of a terrestrial coverage area TCA1–4 serviced by respective terrestrial networks. With conventional satellite antenna sizes, a diameter of a satellite coverage area may be on the order of 200 Km to 2000 km. The likelihood that a mobile terminal will move from one satellite coverage area to another during a short period of time is relatively low when service is provided from a geostationary satellite(s). On the other hand, antenna spot beams provided from non-geostationary satellites may sweep over the earth at relatively high velocities due to the satellite's motion relative to the earth. The reregistration of mobile terminals in non-geostationary satellite networks is discussed, for example, in U.S. Pat. No. 5,289,527 to Tiedmann et al. entitled "Mobile Communications Device Registration Method" wherein reregistration transmissions from a mobile terminal are triggered not by a change in relative position of the satellite antenna spot beams, but instead by a change in the absolute position of the mobile terminal. The disclosure of the Tiedmann et al. patent is incorporated herein in its entirety by reference. In a geostationary satellite network, however, the antenna spot beams define satellite coverage areas that are relatively stationary with respect to the earth.

Because of the relatively large satellite coverage area serviced by an antenna spot beam (as compared with cells of terrestrial coverage areas), the capacity of a satellite network measured in units of "calls per MHz per square kilometer" may be substantially lower than the capacity for a terrestrial network. A satellite network, however, may provide more economic coverage for large expanses of relatively unpopulated terrain, such as ocean, than can be provided by a terrestrial network. Satellite and terrestrial communications networks can thus provide mutually complementary service with terrestrial networks servicing areas of relatively high urban population density, and with satellite networks serving rural areas of relatively low population density as illustrated in FIG. 1.

In such dual-mode system, it may thus be desirable to handle as many calls as possible through the higher capacity terrestrial networks. The satellite network may thus desirably be used to handle calls to and from mobile terminals that cannot be serviced by one of the terrestrial networks. Preferably, a dual-mode system according to embodiments to the present invention can automatically route calls via satellite or terrestrial network to accommodate movement of the dual-mode mobile terminal being called without requiring action on the part of the mobile terminal user. A mobility management sub-system according to a terrestrial network should preferably route calls to the mobile terminal via a terrestrial network when possible, and when service trough the terrestrial network is not possible, the call should be routed through the satellite network.

Coverage of a terrestrial network within its terrestrial coverage area may not be complete, for example, because the nature of the terrain may prevent reception of mobile terminal signals in areas known as "black spots" or because base stations are not close enough is some areas. Terrestrial network coverage may be relatively complete in two neighboring cities and for most areas therebetween, for example, but mobile terminals may be unable to communicate with the terrestrial network at a particular location along a highway between the two cities. Service via a terrestrial network may also be unavailable when a mobile terminal moves into a terrestrial coverage area to which the mobile terminal's subscription is not applicable so that the mobile terminal is denied access. Alternately, a mobile terminal may be unable to access a terrestrial network which operates according to a technology (such as TDMA or CDMA) that is not compatible with the mobile terminal.

In each of the examples of incomplete terrestrial network coverage, a continuous stream of traffic along the highway between the two cities may result in loss of terrestrial network coverage for a large number of mobile terminals at the same location. For dual-mode mobile terminals loosing terrestrial network coverage at this location, a potential number of attempted satellite network registrations at that location could be equal to the traffic of the dual-mode mobile terminals along the highway. As there may be a relatively high number of such points wherein terrestrial network coverage may be regularly lost throughout a region covered by a satellite network, a number of attempted registrations with the satellite network could be excessive.

Mobility management subsystems and methods according to embodiments of the present invention thus can provide for tracking of dual-mode mobile terminals when terrestrial network coverage for the dual-mode mobile terminal is lost without requiring direct registration of the dual-mode mobile terminal with the satellite network. Unnecessary use of satellite network capacity can thus be reduced. According to one aspect of the present invention, a dual-mode mobile terminal is programmed to announce its departure (via a DETACH message) from a terrestrial network as opposed to announcing its arrival (via a registration request) in a satellite network. On receipt of the DETACH message, the terrestrial network from which the mobile terminal has detached forwards this information to the HLR register for the detached mobile terminal located at the native terrestrial network for the detached mobile terminal. The mobility management subsystem for the native terrestrial network can thus route subsequent calls for the detached mobile terminal to the satellite network. Moreover, the mobility management network for the native terrestrial network can forward information identifying a location of the terrestrial coverage area (or base station or paging area) of the terrestrial network from which the mobile terminal detached so that the satellite network can determine the satellite coverage area within which the detached mobile terminal is located and over which antenna spot beam to service the detached mobile terminal.

In the event that the mobile terminal loses terrestrial network coverage without successfully performing a DETACH operation, the native terrestrial network for the mobile terminal can first attempt to route a call to the mobile terminal through the terrestrial network with which the mobile terminal was most recently registered. If the mobile terminal cannot be reached through the terrestrial network with which it was most recently registered, the native mobility management subsystem for the mobile terminal can attempt to route the call to the satellite network. The native mobility management subsystem can also forward information identifying the terrestrial coverage area (or a base station or paging area) of the terrestrial network with which the mobile terminal was most recently registered thereby allowing the satellite network to route the call over an antenna spot beam to the satellite coverage area including the terrestrial coverage area (or base station or paging area) within which the mobile terminal was most recently known to be located. If the call cannot be placed to the mobile terminal via either a terrestrial network or the satellite network, the call can be routed to voice mail.

If a mobile terminal has been switched off and transported a relatively long distance, the location of the terrestrial coverage area (or base station or paging area) with which the mobile terminal was last registered may not provide a useful indication of a current location of the mobile terminal. Accordingly, a dual-mode mobile terminal according to the present invention can store a satellite antenna spot beam identification each time the mobile terminal performs a registration or location update with one of the terrestrial network.

On subsequent power up, the dual-mode mobile terminal can attempt to locate an available terrestrial network, and the mobile terminal may re-register with a located terrestrial network if the mobile terminal is in a paging area different than the paging area with which the mobile terminal was registered before being turned off. If the mobile terminal is powered up but unable to locate an available terrestrial network, the mobile terminal can attempt to receive a spot beam identification for the antenna spot beam servicing the satellite coverage area within which the mobile terminal is now located. The received spot beam identification can then be compared with the stored spot beam identification to determine if the mobile terminal has been moved from one satellite coverage area serviced by the first antenna spot beam to a second satellite coverage area serviced by the second antenna spot beam.

If the stored antenna spot beam identification is the same as the received antenna spot beam identification, the mobile terminal has not moved outside the satellite coverage area in which the native mobility management subsystem for the mobile terminal will assume that the mobile terminal is located. Accordingly, upon failure of the mobile to respond to an incoming call page from the terrestrial network with which the mobile terminal was last registered, the incoming call page can be forwarded to the satellite network and transmitted using an antenna spot beam servicing the satellite coverage area including the terrestrial cell in which the mobile terminal was last registered. In other words, a registration with the satellite network is not needed because the mobility management subsystem for the mobile terminal can provide course but sufficiently accurate information to the satellite system relating to the location of the mobile terminal. A load of mobile terminal registrations with the satellite network can thus be reduced.

If the stored antenna spot beam identification is different than the received antenna spot beam identification, the mobile terminal may have moved from one satellite coverage area to another satellite coverage area since the last registration with a terrestrial network. Accordingly, the mobile terminal may preferably perform a registration with the satellite network because the mobility management subsystem may be unable to provide accurate information to the satellite network relating to the location of the mobile terminal. In other words, registration with the satellite network may be useful because the mobility management subsystem for the mobile terminal may not have accurate information relating to the location of the mobile terminal.

By operating terrestrial communications networks, satellite communications networks, and mobile terminals as discussed above, calls may be more reliably forwarded to dual-mode mobile terminals operating in systems including coordinated terrestrial and satellite networks while reducing unnecessary registrations of mobile terminals with the satellite network. Accordingly, saturation of satellite network capacity due to mobile terminal registrations can be reduced. Moreover, aspects of mobile terminals and terrestrial and satellite communications systems can be combined with searching techniques as discussed, for example, in U.S. Pat. No. 5,594,776 to Dent entitled "Efficient Paging System"; and in U.S. Pat. No. 5,826,173 to Dent entitled "Efficient Paging System With Sleep Mode Duration Determined By The Guaranteed Number Of Repeats" to provide reliable call delivery. Both of these patents are to the inventor of the present invention, both of these patents are assigned to the assignee of the present invention, and the disclosures of both of these patents are incorporated herein in their entirety by reference.

A terrestrial network, for example, may transmit first pages for a mobile terminal in a location that the mobile terminal is most likely located and then transmit subsequent pages for the mobile terminal in an expanding area surrounding the most likely location if the mobile terminal does not respond to the first pages. In addition or in the alternative, a terrestrial network may transmit first pages for the mobile terminal at a normal power level and/or with normal signal coding and then transmit subsequent pages for the mobile terminal usng successively higher power and/or successively more robust signal coding. A first page, for example, may be transmitted on a first try channel which may be a cellular channel, and if the mobile terminal does not respond to the first page, a second page may be transmitted on a second channel which may be a satellite channel.

Figure 4:
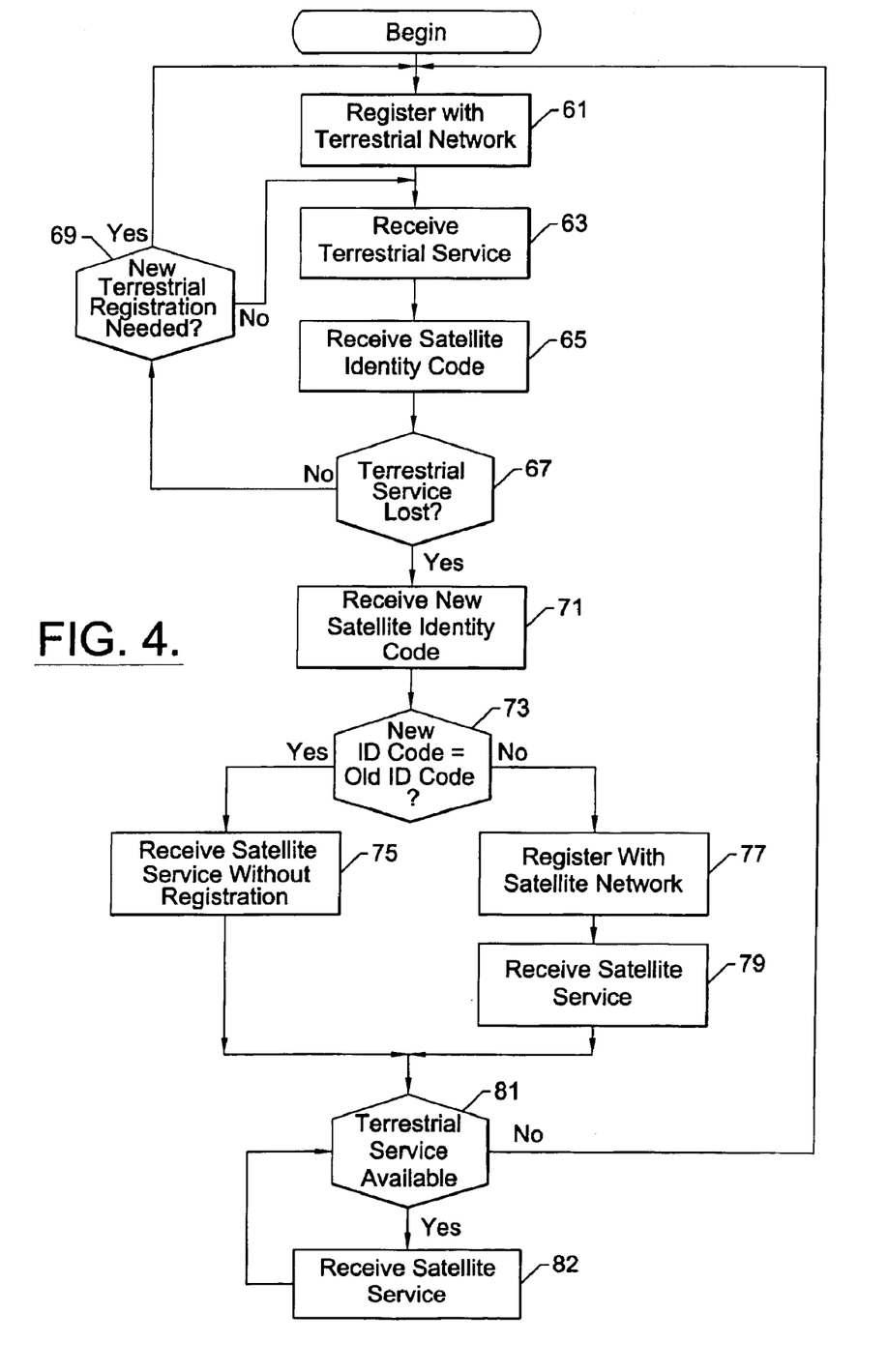
FIG. 4 is a flow chart illustrating operations of a mobile terminal according to embodiments to the present invention.
Figure 5:
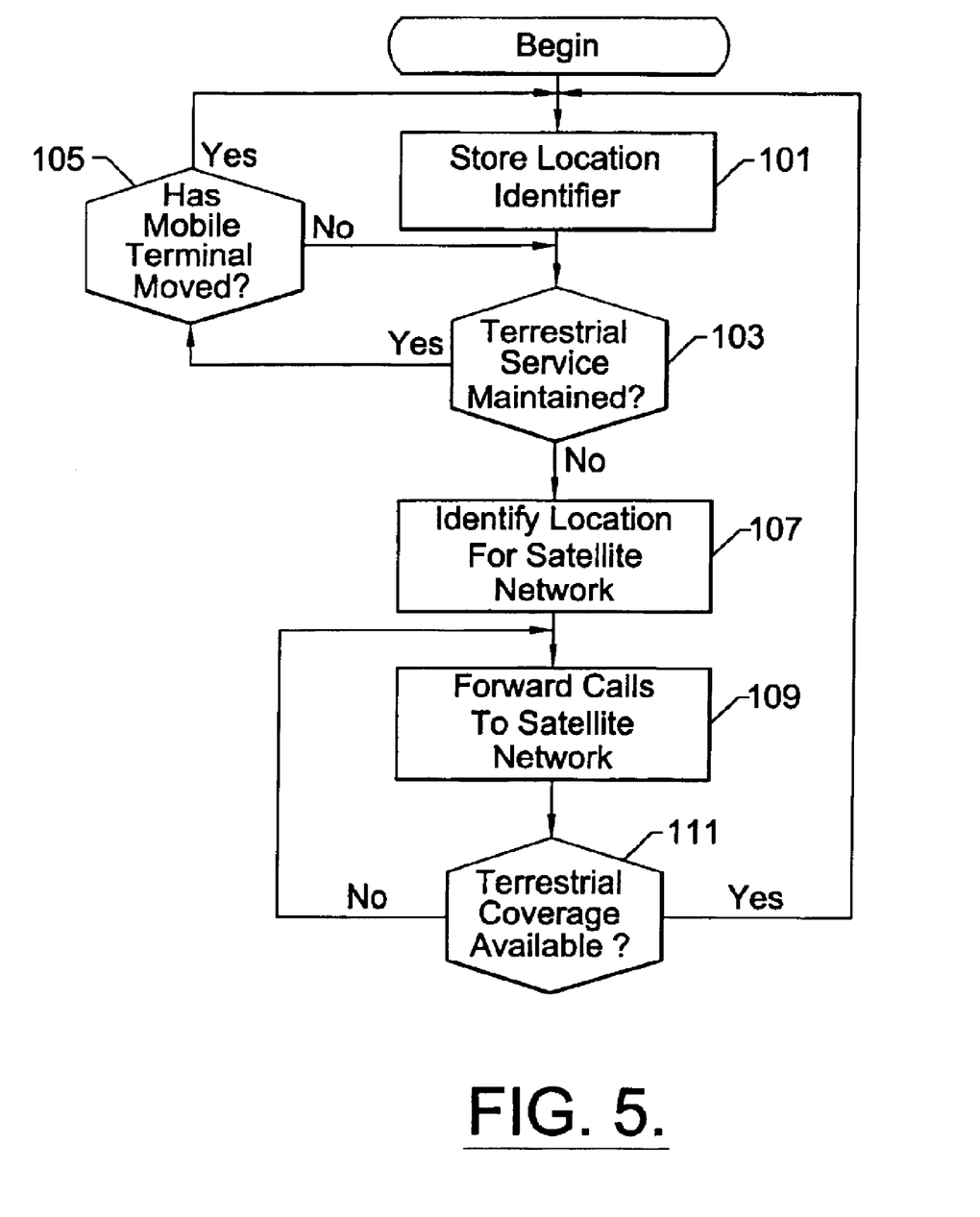
FIG. 5 is a flow chart illustrating mobility management operations according to embodiments to the present invention.

Examples of operations of mobile terminals and communications networks according to the present invention are illustrated in the flow charts of FIGS. 4 and 5. In FIG. 4, a mobile terminal may register to receive communications service from a terrestrial communications network at block 61, and communications service can be received at block 63. The registration may be performed, for example, when the mobile terminal is turned on, when the mobile terminal detects that it has move to a new paging area, when the mobile terminal determines that it has moved to a new terrestrial coverage area, and/or when a communication is transmitted by the mobile terminal. While registered to receive communications service from the terrestrial network, the mobile terminal is considered to be receiving communications service from the terrestrial network whether communications such as phone calls are provided or not.

While receiving communications from the terrestrial network, the mobile terminal receives an identity code (beam ID) from the satellite network identifying the antenna spot beam servicing the satellite coverage area in which mobile terminal is located at block 65. As long as communications service with the terrestrial network is maintained at block 67, the mobile terminal can determine if a new registration with the terrestrial network is needed at block 69 and continue to receive terrestrial communications service. According to one embodiment of the present invention, an identity code from the satellite network can be received at block 65 each time or only when the mobile terminal registers with a terrestrial network.

If communications service with the terrestrial network are lost at block 67, the mobile terminal may receive a new identity code identifying the antenna spot beam servicing the satellite coverage area in which the mobile terminal is now located at block 71. If the new identity code is the same as the old identity code at block 73, the mobile terminal receives communication service from the satellite network without performing a registration with the satellite network at block 75. For example, the mobile terminal may move outside terrestrial coverage area TCA1 of FIG. 1 while remaining in satellite coverage area SCA1, and so that the native terrestrial network for the mobile terminal can correctly assume that the mobile terminal is still in area SCA1.

If the new identity code is not the same as the previous identity code at block 73, the mobile terminal may perform a registration with the satellite network at block 77 before receiving satellite communications service at block 79. For example, the mobile terminal may be receiving terrestrial communications service within area TCA1 so that the first identity code identifies the satellite antenna spot beam for area SCA1. If the mobile terminal is turned off and transported to area SCA2 before being turned on again, the mobile terminal may need to register with the satellite network to receive service in area SCA2 because the terrestrial network may be unable to anticipate this move. Satellite communications may be maintained until the mobile terminal is moved to an area serviced by a terrestrial network at blocks 81 and 82.

Mobility management operations are further illustrated in the flow chart of FIG. 5. At block 101, a native terrestrial network can store a location identifier for a dual mode mobile terminal that is registered for service with the native terrestrial network or another terrestrial network compatible for service with the mobile terminal. As discussed above, the location identifier may be a VLR ID stored in the HLR register corresponding to the mobile terminal, and the VLR ID may be used identify a VLR register for a paging area in the native terrestrial network or another terrestrial network within which the mobile terminal is located. As long a terrestrial service is maintained for the mobile terminal at block 103, new location identifiers for the mobile terminal can be stored if the mobile terminal moves to a location corresponding to a new location identifier at block 105. A new location identifier may be stored, for example, if the mobile terminal moves to a different paging area and/or to a coverage area for a different terrestrial network.

If terrestrial service is lost at block 103, the native terrestrial network can identify for the satellite network the location within which the mobile terminal has been most recently registered for service with a terrestrial network at block 107. Accordingly, the satellite network can forward subsequent calls to the mobile terminal without requiring registration from the mobile terminal provided that the mobile terminal does not move to a new satellite coverage area. For example, the mobile terminal may be moved outside terrestrial coverage area TCA1 while remaining within satellite coverage area SCA1. As discussed above with regard to FIG. 4, the mobile terminal can perform a registration with the satellite network in the event that service is lost with a terrestrial network and the mobile terminal has been moved to a new satellite coverage area (such as SCA2). Calls for the mobile terminal can then be forwarded by the native terrestrial network to the satellite network at block 109 until terrestrial service for the mobile terminal is again available at block 111.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of operating a mobile terminal providing wireless communications, the method comprising:

receiving communications service from a first communications network providing service over a first coverage area;

while receiving communications service from the first communications network, receiving a first identity code from a second communications network providing service over a plurality of second coverage areas wherein a first one of the second coverage areas includes the first coverage area and wherein the first identity code from the second communications network identifies availability of service with the second communications network in the first one of the second coverage areas;

after loss of communications with the first communications network, receiving a second identity code from the second communications network; and when the second identity code from the second communications network is different than the first identity code from the second communications network, performing a registration with the second communications network so that communications service can be received by the mobile terminal from the second communications network in a second one of the second coverage areas corresponding to the second identity code from the second communications network.

2. The method according to claim 1 wherein the following also is performed after loss of communications with the first communications network:

when the second identity code from the second communications network is the same as the first identity code from the second communications network, receiving communications service from the second communications network in the first of the second coverage areas without performing a registration with the second communications network.

3. The method according to claim 1 wherein the first communications network comprises a terrestrial communications network.

4. The method according to claim 3 wherein the first communications network comprises a cellular terrestrial communications network.

5. The method according to claim 1 wherein the second communications network comprises a satellite communications network.

6. The method according to claim 5 wherein service for each of the second coverage areas is indicated by a respective satellite antenna spot beam and wherein each respective satellite antenna spot beam is identified by a respective identity code.

7. The method according to claim 6 wherein performing a registration with the second communications network comprises transmitting a location update request message using a satellite antenna spot beam identified by the second identity code.

8. The method according to claim 1 wherein receiving communications service from the first communications network comprises:

receiving a first identity code from the first communications network;

after receiving the first identity code from the first communications network, receiving a second identity code from the first communications network; and when the first identity code from the first communications network and the second identity code from the first communications network are different transmitting a location update request to the first communications network.

9. The method according to claim 8 wherein when the first identity code from the first communications network and the second identity code from the first communications network are the same, communications service from the first communications network is maintained without transmitting a location update request to the first communications network.

10. The method according to claim 8 wherein the first coverage area comprises a plurality of paging areas, wherein each paging area corresponds to a respective identity code from the first communications network.

11. A mobile terminal providing wireless communications, the mobile terminal comprising:

a receiver that receives communications from a first communications network providing service over a first coverage area and a second communications network providing service over a plurality of second coverage areas wherein a first one of the second coverage areas includes the first coverage area, wherein while receiving communications service from the first communications network, the receiver receives a first identity code from the second communications network, wherein the first identity code from the second communications network identifies availability of service with the second communications network identifies availability of service with the second communications network in the first one of the second coverage areas, and wherein after loss of communications with the first communications network, the receiver receives a second identity code from the second communications network; and a transmitter coupled to the receiver wherein when the second identity code from the second communications network is different than the first identity code from the second communications network, the transmitter performs a registration with the second communications network so that communications service can be received by the receiver from the second communications network in a second one of the second coverage areas corresponding to the second identity code from the second communications network.

12. The mobile terminal according to claim 11 wherein when the second identity code from the second communications network is the same as the first identity code from the second communications network, the receiver receives communications service from the second communications network in the first of the second coverage areas without performing a registration with the second communications network.

13. The mobile terminal according to claim 11 wherein the first communications network comprises a terrestrial communications network.

14. The mobile terminal according to claim 13 wherein the first communications network comprises a cellular terrestrial communications network.

15. The mobile terminal according to claim 11 wherein the second communications network comprises a satellite communications network.

16. The mobile terminal according to claim 15 wherein service for each of the second coverage areas is provided by a respective satellite antenna spot beam and wherein each respective satellite antenna spot beam is identified by a respective identity code.

17. The mobile terminal according to claim 16 wherein performing a registration with the second communications network comprises transmitting a location update request message using a satellite antenna spot beam identified by the second identity code.

18. The mobile terminal according to claim 11 wherein the receiver receives a first identity code from the first communications network, wherein after receiving the first identity code from the first communications network, the receiver receives a second identity code from the first communications network, wherein the processor compares the first identity code from the first communications network and the second identity code from the first communications network, and wherein when the first identity code from the first communications network and the second identity code from the first communications network are different, the transmitter transmits a location update request to the first communications network.

19. The mobile terminal according to claim 18 wherein when the first identity code from the first communications network and the second identity code from the first communications network are the same, communications service from the first communications network is maintained without transmitting a location update request to the first communications network.

20. The mobile terminal according to claim 18 wherein the first coverage area comprises a plurality of paging areas, wherein each paging area corresponds to a respective identity code from the first communications network.

* * * * *